United States Patent

Satou et al.

Patent Number: 5,539,051
Date of Patent: Jul. 23, 1996

[54] RESIN COMPOSITION FOR COATING AND PAINT

[75] Inventors: Kuniaki Satou; Tsutomu Mamiya; Takashi Amano, all of Ibaraki; Akira Hironaka, Tokushima, all of Japan

[73] Assignee: Hitachi Chemical Company Co., Ltd., Tokyo, Japan

[21] Appl. No.: 136,246

[22] Filed: Oct. 15, 1993

[30] Foreign Application Priority Data

Oct. 15, 1992 [JP] Japan ................................. 4-277114
Aug. 23, 1993 [JP] Japan ................................. 5-207592

[51] Int. Cl.$^6$ ................................. C08L 83/04; C08L 83/00
[52] U.S. Cl. ................................. 525/101; 525/102; 525/197; 525/288; 525/479; 525/209; 523/201; 523/212; 523/213
[58] Field of Search ................................. 525/105, 197, 525/209, 254, 479, 101, 288; 523/201, 212, 213

[56] References Cited

U.S. PATENT DOCUMENTS

| | | | |
|---|---|---|---|
| 4,334,036 | 6/1982 | Yonezawa et al. | 525/105 |
| 4,972,027 | 11/1990 | Isozaki et al. | 525/479 |
| 5,100,962 | 3/1992 | Sawada et al. | 525/209 |

FOREIGN PATENT DOCUMENTS

| | | |
|---|---|---|
| 0308203 | 9/1988 | European Pat. Off. |
| 0497231 | 8/1992 | European Pat. Off. |
| 9211327 | 7/1992 | WIPO |

*Primary Examiner*—Tae Yoon
*Attorney, Agent, or Firm*—Antonelli, Terry, Stout & Kraus

[57] ABSTRACT

There are disclosed a resin composition for coating which comprises a mixture of (i) a non-aqueous dispersion type resin containing
 (A) a vinyl polymer soluble in an organic solvent mainly comprising an aliphatic hydrocarbon, and
 (B) a vinyl polymer particle which is insoluble in the organic solvent and obtained by polymerizing a polymerizable unsaturated compound in the organic solvent using the vinyl polymer (A) as a dispersant, and (ii) a solvent type resin of
 (C) a vinyl polymer having a silyl group represented by the formula (I) which is soluble in the organic solvent:

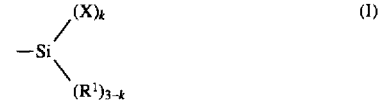

wherein $R^1$ represents an alkyl group, an aryl group or an aralkyl group, X represents a halogen atom, an alkoxy group, an acyloxy group or a hydroxy group, and k is an integer of 1 to 3, and a paint containing the same.

15 Claims, No Drawings

RESIN COMPOSITION FOR COATING AND PAINT

BACKGROUND OF THE INVENTION

This invention relates to a resin composition for coating and a paint containing the resin composition.

A paint to be used to mortar, slate or concrete for building facing is required to have high durability such as weather resistance, water resistance, moisture proof, alkali resistance and acid resistance. A paint using a copolymer mainly comprising an acrylate and a methacrylate which is so-called a solvent type acrylic resin as a vehicle has been used for building facing since it is excellent in coating workability and in durability. There is, however, a problem of toxicity to a human body or pollution to environment, since a thinner mainly comprising toluene and xylene is used for coating with a large amount. Also, when the paint is used for repairing an outer coating film, toluene and xylene which have higher dissolving power and contained in the paint violate the outer coating film to cause a lifting phenomenon so that such a paint can be difficultly used for repair. On the other hand, as a paint in which the problems of repairing property or toxic property to human body or environment have solved, there is a paint using an acrylic emulsion resin which uses water as a medium. However, it is inferior in durability as a coating for building facing, particularly in water resistance and moisture proof so that it cannot be practically used.

As a resin having intermediate characteristics between the above solvent type acrylic resin and the acrylic emulsion resin, there is a non-aqueous dispersion type acrylic resin. The non-aqueous dispersion type acrylic resins use an aliphatic hydrocarbon or a solvent mainly comprising an aliphatic hydrocarbon as a solvent so that toxicity to human body or environment is small as compared to that of the conventional solvent type acrylic resins. Also, an emulsifier having a strong hydrophilic property is not contained therein so that durability is also good. Whereas the non-aqueous dispersion type acrylic resin has such characteristics, weather resistance is insufficient as compared to those of the solvent type acryl-urethane paint or a fluorine resin, and improvements in characteristics have been desired.

On the other hand, a silicone resin is excellent in heat resistance and weather resistance, and a silicone-modified acrylic resin which is utilized the characteristics of the silicone resin has been tried to use as a paint. In Japanese Patent Publication No. 443/1988 (which corresponds to U.S. Pat. No. 4,334,036), there is disclosed a process of hydrolyzing and condensing a solvent type acrylic resin having a silyl group in the presence of a curing catalyst. A coating film obtained by the process is excellent in chemical resistance and water resistance but mechanical strength thereof is not necessarily sufficient and there are also defects of poor stain resistance or poor coating workability. Also, in Japanese Provisional Patent Publication No. 116605/1987 (which corresponds to U.S. Pat. No. 4,965,312), there is disclosed a process for preparing a non-aqueous dispersion type acrylic resin by polymerizing an acrylate(s) and a methacrylate(s) in the presence of a polysiloxane resin. In this method, a non-aqueous dispersion can be obtained but film forming property is insufficient. Further, in Japanese Provisional Patent Publications No. 75502/1989 and No. 95116/1989 (which correspond to EP-A-0 308 203), there is disclosed a composition in which a curing catalyst is formulated to a non-aqueous dispersion using an acrylic resin having a silyl group as a dispersion stabilizer or dispersant. These compositions are excellent in mechanical strength and chemical resistance of a coating film but stain resistance or storage stability is not necessarily sufficient. Furthermore, in Japanese Provisional Patent Publication No. 64110/1990, there is disclosed a non-aqueous dispersion type composition using a vinyl type polymer having a hydrolizable silyl group as a dispersion resin particle, but the composition is inferior in stain resistance or coating film hardness.

SUMMARY OF THE INVENTION

The present invention is to overcome the problems as mentioned above and to provide a resin composition for a coating which is excellent in stain resistance and has sufficient characteristics in other properties and a paint using the same.

That is, the present invention is a resin composition for coating which comprises a mixture of (i) a non-aqueous dispersion type resin containing
   (A) a vinyl polymer soluble in an organic solvent mainly comprising an aliphatic hydrocarbon, and
   (B) a vinyl polymer particle which is insoluble in the organic solvent and obtained by polymerizing a polymerizable unsaturated compound in the organic solvent using the vinyl polymer (A) as a dispersant, and (ii) a solvent type resin of
   (C) a vinyl polymer having a silyl group represented by the formula (I) which is soluble in the organic solvent:

wherein $R^1$ represents an alkyl group, an aryl group or an aralkyl group, X represents a halogen atom, an alkoxy group, an acyloxy group or a hydroxy group, and k is an integer of 1 to 3, and a paint containing the same.

DESCRIPTION OF THE PREFERRED EMBODIMENTS

In the present invention, the vinyl polymer (A) is used as a dispersant of the non-aqueous dispersion type resin and a method for producing the same is known in the art. For example, a compound having a polymerizable unsaturated double bond such as (meth)acrylate is polymerized by the method known in the art. However, it is necessary that the resulting vinyl polymer (A) should be dissolved in an organic solvent mainly comprising an aliphatic hydrocarbon. Thus, the compound having a polymerizable unsaturated double bond is preferably used as a main component, i.e., an amount of 50% by weight or more, more preferably 60% by weight or more. Specific examples of the compound may include a (meth)acrylate having 4 or more to 30 or less alkyl carbon atoms such as n-butyl (meth)acrylate, t-butyl (meth)acrylate, isobutyl (meth)acrylate, 2-ethylhexyl (meth)acrylate, lauryl (meth)acrylate, hexyl (meth)acrylate, cyclohexyl (meth)acrylate, octyl (meth)acrylate, isobornyl (meth)acrylate and dicyclopentanyl (meth)acrylate, and these compounds may be used singly or in combination of two or more. Here, the term "(meth)acrylate" means a methacrylate or an acrylate (hereinafter the same).

In the vinyl polymer (A), the above (meth)acrylate may be copolymerized with a (meth)acrylate having 3 or less alkyl carbon atoms such as methyl (meth)acrylate, ethyl (meth)acrylate, n-propyl (meth)acrylate and isopropyl (meth)acrylate; a hydroxy group-containing (meth)acrylate such as 2-hydroxyethyl (meth)acrylate and 2-hydroxypropyl (meth)acrylate; an amino group-containing (meth)acrylate such as N,N-dimethylaminoethyl (meth)acrylate, N,N-diethylaminoethyl (meth)acrylate and N,N-dimethylaminopropyl (meth)acrylate so long as the resulting vinyl polymer (A) is dissolved in the organic solvent mainly comprising an aliphatic hydrocarbon.

Further, the other polymerizable unsaturated compounds including styrene, vinyl toluene, a substituted styrene such as α-methyl styrene, vinyl chloride, vinylidene chloride, acrylonitrile and acrylamide may be used in combination.

As a polymerization initiator to be used for the polymerization reaction, there may be mentioned, for example, an organic peroxide such as isobutyl peroxide, lauroyl peroxide, 3,5,5-trimethylhexanoyl peroxide, octanoyl peroxide, t-butylcumyl peroxide, benzoyl peroxide, dichlorobenzoyl peroxide, dicumyl peroxide, di-t-butyl peroxide, 1,1-bis(t-butylperoxy)-3,3,5-trimethylcyclohexane, 3,3,5-trimethylcyclohexanon peroxide, methylcyclohexanone peroxide, diisobutylperoxy dicarbonate, 2-diethylhexylperoxy dicarbonate, 2,5-dimethyl-2,5-bis(2-ethylhexanoylperoxy)hexane, 1,1-bis(t-hexylperoxy)- 3,3,5-trimethylcyclohexane, 1,1-bis(t-hexylperoxy)cyclohexane, 1,1-bis(t-butylperoxy)cyclohexane, 2,2-bis(4,4-di-t-butylperoxycyclohexyl)propane, 2,2-bis(t-butylperoxy)butane, t-butyl hydroperoxide, cumen hydroperoxide, diisopropylbenzene hydroperoxide, methyl ethyl ketone peroxide, cyclohexanone peroxide, t-butylperoxy-2-ethylhexanoate, 1,1,3,3-tetramethylbutylperoxy-2-ethylhexanoate, t-hexylperoxy-2-ethylhexanoate and t-butylperoxyisobutyrate; an azo type compound such as 2,2'-azobis-(isobutyronitrile), dimethylazodiisobutyrate, 2,2'-azobis-(2,4-dimethylvaleronitrile) and 2,2'-azobis(2-methylbutyronitrile), and they can be used singly or in combination of two or more. The amount of the polymerization initiator may vary depending on the molecular weight of the vinyl polymer (A) to be obtained, but generally preferably in an amount of 0.1 to 10.0% by weight based on the total amount of the whole polymerizable unsaturated compounds.

If necessary, a chain transfer agent such as n-dodesylmercaptane, n-butylmercaptane, γ-mercarptopropyltrimethoxy silane, γ-mercaptopropylmethyldimethoxy silane and γ-mercaptopropyltriethoxy silane may be used to control the molecular weight of the vinyl polymer (A).

The polymerization reaction of the vinyl polymer (A) of the present invention may be carried out by any of the known method such as a solution polymerization, a suspension polymerization, an emulsion polymerization and a bulk polymerization, but a solution polymerization is particularly preferred since the product can be supplied to the next polymerization process as such.

The solution polymerization can be carried out in an organic solvent mainly comprising an aliphatic hydrocarbon, i.e., containing 50% by weight or more of the aliphatic hydrocarbon, preferably 70% by weight or more. In the organic solvent to be used in the present invention, an organic solvent comprising an aliphatic hydrocarbon alone is included as a matter of course. As the aliphatic hydrocarbon, there may be mentioned, for example, a linear aliphatic hydrocarbon such as pentane, hexane, heptane, octane and decane; and an alicyclic hydrocarbon such as cyclohexane, methylcyclohexane, ethylcyclohexane and cycloheptane. Also, a mixed solvent mainly comprising an aliphatic hydrocarbon, i.e., containing 70% by weight or more of an aliphatic hydrocarbon, such as mineral spirit, mineral thinner, petroleum spirit, white spirit and mineral turpentine may be used. Further, it is possible to add other organic solvent including an aromatic hydrocarbon such as toluene and xylene; an ester such as ethyl acetate and butyl acetate; a ketone such as acetone, methyl ethyl ketone and methyl isobutyl ketone; an alcohol such as methanol, ethanol, propanol and butanol, but when these organic solvents other than the aliphatic hydrocarbon are added to, these amounts are preferably 30% by weight or less based on the total amount of the organic solvent.

The vinyl polymer (A) is obtained by the method as mentioned above, and then a polymerizable unsaturated compound for forming a vinyl polymer particle (B) is polymerized in an organic solvent in which the vinyl polymer (A) is dissolved to obtain vinyl polymer particles (B) which are insoluble in the solvent. The resulting vinyl polymer particles (B) are insoluble in the organic solvent mainly comprising the aliphatic hydrocarbon. If the vinyl polymer particles (B) are soluble in the solvent mainly comprising the aliphatic hydrocarbon, the resulting product is not a non-aqueous dispersion type resin and a resin for coating which is excellent in effects and available as in the present invention cannot be obtained.

The vinyl polymer particles (B) which are insoluble in the organic solvent mainly comprising the aliphatic hydrocarbon of the present invention can be obtained by polymerizing a polymerizable unsaturated compound according to the known method as in the vinyl polymer (A). However, to make the resulting vinyl polymer particles (B) insoluble in the organic solvent, as the polymerizable unsaturated compound used as a starting material, there may be mainly used, for example, a (meth)acrylate having 3 or less alkyl carbon atoms such as methyl (meth)acrylate, ethyl (meth)acrylate, n-propyl (meth)acrylate and isopropyl (meth)acrylate; a hydroxy group-containing (meth)acrylate such as 2-hydroxyethyl (meth)acrylate and 2-hydroxypropyl (meth)acrylate; and an amino group-containing (meth)acrylate such as N,N-dimethylaminoethyl (meth)acrylate, N,N-diethylaminoethyl (meth)acrylate and N,N-dimethylaminopropyl (meth)acrylate. These polymerizable unsaturated compounds are preferably polymerized singly or in combination of two or more in an amount of 50% by weight or more, more preferably 60% by weight or more based on the total amount of the whole polymerizable unsaturated compound. The (meth)acrylate having 3 or less alkyl carbon atoms is preferably used as the polymerizable unsaturated compound in an amount of 60% by weight, more preferably 70% by weight based on the total weight of the polymerizable unsaturated compound.

Also, within the range wherein the component (B) becomes insoluble in the organic solvent, a polymerizable unsaturated compound including a (meth)acrylate having 4 or more alkyl carbon atoms such as n-butyl (meth)acrylate, isobutyl (meth)acrylate, t-butyl (meth)acrylate, 2-ethylhexyl (meth)acrylate, lauryl (meth)acrylate, cyclohexyl (meth)acrylate, isobornyl (meth)acrylate and dicyclopentanyl (meth)acrylate may be used in combination.

Further, the other polymerizable unsaturated compounds including styrene, a substituted styrene such as vinyl toluene, vinyl chloride, vinylidene chloride, acrylonitrile and acrylamide may be used in combination.

As a polymerization initiator to be used for the polymerization reaction of the vinyl polymer particles (B), the same polymerization initiator as explained above may be used. The amount of the initiator may vary depending on the molecular weight of the vinyl polymer particles to be obtained, but generally preferably in an amount of 0.1 to 10.0% by weight based on the amount of the whole polymerizable unsaturated compounds.

The non-aqueous dispersion type resin can be obtained as mentioned above and the ratio of the vinyl polymer (A) soluble in the organic solvent and the vinyl polymer particles (B) insoluble in the organic solvent is preferably 10/90 to 60/40 (the former/the latter) in weight ratio. If it is less than 10/90, there is a tendency of worsening dispersibility, while if it exceeds 60/40, drying characteristics is poor and coating operation is sometimes hindered. For effecting polymerization, an additive such as other dispersant(s) or rheology controlling agent may be added to the reaction system in combination.

The average particle size of the vinyl polymer particles (B) in the non-aqueous dispersion type resin is generally preferably within the range of about 100 to 2000 nm. If the average particle size is less than 100 nm, the viscosity of the varnish becomes likely high, while if it exceeds 2000 nm, particles likely swell or aggregate during storage.

In the present invention, by chemically binding the vinyl polymer (A) and the vinyl polymer particle (B) mentioned above, storage stability can be further improved. The method of binding these materials can be carried out by polymerizing the polymerizable unsaturated compound in the presence of the vinyl polymer (A) having a polymerizable unsaturated double bond. Incorporation of the unsaturated double bond into the vinyl polymer (A) can be carried out, for example, using a carboxyl group-containing polymerizable unsaturated compound as a copolymer component of the vinyl polymer (A), by reacting an epoxy group-containing polymerizable unsaturated compound such as glycidyl (meth)acrylate and allyl glycidyl ether with the carboxyl group. Of course, it can be carried out by previously incorporating an epoxy group into the resin and then reacting the carboxyl group-containing polymerizable unsaturated compound therewith.

The resin composition for coating according to the present invention can be obtained by mixing the above non-aqueous dispersion type resin and a solvent type resin comprising a vinyl polymer (C) which is soluble in the above organic solvent and having a silyl group represented by the above formula (I).

In the formula (I), $R^1$ is preferably an alkyl group having 1 to 18 carbon atoms, an aryl group such as a phenyl group and a naphthyl group or an aralkyl group such as a benzyl group; X is preferably a halogen atom such as a fluorine atom, a chlorine atom, a bromine atom and an iodine atom, an alkoxy group having 1 to 8 carbon atoms, an acyloxy group having 2 to 10 carbon atoms or a hydroxy group. More preferably, $R^1$ is a methyl group and a phenyl group, and X is a methoxy group, an ethoxy group, a propoxy group and a butoxy group.

The vinyl polymer (C) having the silyl group represented by the formula (I) can be obtained by the conventionally known method and, for example, it can be obtained by polymerizing a polymerizable unsaturated compound such as a (meth)acrylate and a polymerizable unsaturated compound having the silyl group represented by the formula (I) according to the conventional method. The polymerizable unsaturated compound such as the (meth)acrylate may include those as exemplified in the above vinyl polymer (A). Here, the resulting vinyl polymer (C) should be soluble in the organic solvent mainly comprising the aliphatic hydrocarbon.

The polymerizable unsaturated compound having the silyl group represented by the formula (I) may preferably include, for example, a polymerizable unsaturated compound represented by the formula (II):

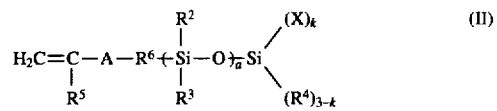

wherein $R^2$, $R^3$ and $R^4$ each represent a hydrogen atom, an alkyl group, an aryl group or an aralkyl group; $R^5$ represents a hydrogen atom or a methyl group; $R^6$ represents a divalent organic group; A represents —COO— or a phenylene group; X represents a halogen atom, an alkoxy group, an acyloxy group or a hydroxy group; a is 0 or an integer of 1 to 20; and k is an integer of 1 to 3.

In the above formula (II), $R^2$, $R^3$ and $R^4$ each have the same meanings as in those of $R^1$ in the formula (I), $R^5$ is a hydrogen atom or a methyl group, $R^6$ is a divalent organic group such as an alkylene group having 1 to 6 carbon atoms, A represents —COO— or a phenylene group; X has the same meaning as in those of the formula (I), a is 0 or an integer of 1 to 20, preferably 0 to 5, k is an integer of 1 to 3.

Specific examples of the polymerizable unsaturated compound represented by the formula (II) according to the present invention may include, for example, γ-(meth)acryloxyethyltrimethoxy silane, γ-(meth)acryloxyethyltriethoxy silane, γ-(meth)acryloxypropyltrimethoxy silane, γ-(meth)acryloxypropyltriethoxy silane, γ-(meth)acryloxypropylmethyldimethoxy silane, γ-(meth)acryloxypropyldimethylmethoxy silane, γ-(meth)acryloxypropylmethyldiethoxy silane, γ-(meth)acryloxypropyldimethylethoxy silane, γ-(meth)acryloxypropyltrichloro silane, γ-(meth)acryloxypropylmethyldichloro silane, γ-(meth)acryloxypropyldimethylchloro silane, γ-(meth)acryloxypropyltripropoxy silane, γ-(meth)acryloxypropylmethyldipropoxy silane, γ-(meth)acryloxypropyltributoxy silane, γ-(meth)acryloxybutyltrimethoxy silane, γ-(meth)acryloxypentyltrimethoxy silane, γ-(meth)acryloxyhexyltrimethoxy silane, γ-(meth)acryloxyhexyltriethoxy silane, γ-(meth)acryloxyoctyltrimethoxy silane, γ-(meth)acryloxydecyltrimethoxy silane, γ-(meth)acryloxydodecyltrimethoxy silane, γ-(meth)acryloxyoctadecyltrimethoxy silane,

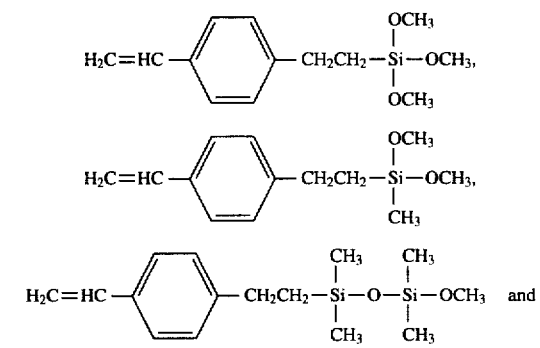

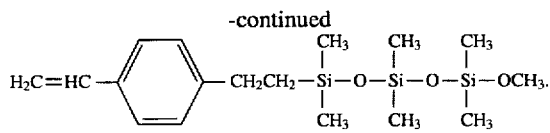

Here, the term "(meth)acryloxy" means "acryloxy" or "methacryloxy".

As the other polymerizable unsaturated compound having the silyl group represented by the formula (I), there may be mentioned, for example, a vinyl silane compound such as trimethoxy vinyl silane, triethoxy vinyl silane, tris(ethyl methyl ketoxime) vinyl silane and triacetoxy vinyl silane; and an allyl silane compound such as allyl trimethoxy silane, allyl triethoxy silane and allyl trichloro silane.

These polymerizable unsaturated compound having the silyl group may be used singly or in combination of two or more.

The polymerizable unsaturated compound having the silyl group as mentioned above can be copolymerized with the above polymerizable unsaturated compound as exemplified as the starting materials for the vinyl polymer (A). In this case, the polymerizable unsaturated compound having the silyl group is preferably formulated in an amount of 5 to 40% by weight based on the total amount of the whole polymerizable unsaturated compound and copolymerized. If the amount is less than 5% by weight, weather resistance of the resulting film is poor, while if it exceeds 40% by weight, the resin has high viscosity and sometimes gelled. The polymerization reaction can be carried out in the same manner as in the preparation method of the above vinyl polymer (A).

The resulting vinyl polymer (C) is made a solution type resin soluble in the solvent mainly comprising an aliphatic hydrocarbon.

In the present invention, it is important to use the above non-aqueous dispersion type resin and the above solution type resin which is the vinyl polymer (C) in combination, and they are preferably mixed in the ratio (the former/the latter) of 97/3 to 60/40, particularly 97/3 to 70/30 in terms of the solid component weight ratio. If the ratio exceeds 97/3, curability of the film becomes poor, while if it is less than 60/40, sags or runs will likely occur when coating whereby coating workability is poor.

Also, it is preferred that the vinyl polymer particles (B) in the above non-aqueous dispersion type resin are modified so as to have the silyl group represented by the formula (I) since curability is improved.

In such a case, the polymerizable compound having a silyl group represented by the formula (I) is preferably used in an amount of 1 to 40% by weight based on the total amount of the polymerizable unsaturated compound constituting the component (B). The silyl group represented by the formula (I) is preferably not contained in the vinyl polymer (A) in view of contamination resistance and storage stability.

The vinyl polymer (A) and the vinyl polymer particle (B) each preferably have the number average molecular weight (Mn) measured by gel permeation chromatography using a standard polystyrene calivration curve of 5,000 to 50,000 and the molecular weight of the vinyl polymer particle (B) is preferably larger than that of the vinyl polymer (A). The vinyl polymer (C) preferably has the number average molecular weight of 1,000 to 40,000.

To the resin composition for coating of the present invention, any one of an acidic compound, a basic compound and a tin-containing compound, or a mixture of the tin-containing compound and the acidic compound or the tin-containing compound and the basic compound may be formulated as a curing agent. As these compounds, the acidic compound may include, for example, p-toluenesulfonic acid, acetic acid, (meth)acrylic acid, dibutylphosphoric acid and dioctylphosphoric acid; the basic compound may include, for example, n-butyl amine, t-butyl amine, 2-ethylhexyl amine, γ-aminopropyltriethoxy silane, trioctyl amine, dibutyl amine, hexyl amine and triethyl amine; and the tin-containing compound may include, for example, dibutyl tin dilaurate, dibutyl tin dimaleate, dibutyl tin diacetate and dibutyl tin dioctoate. The amount of the curing agent is preferably 0.001 to 30 parts by weight, more preferably 0.05 to 20 parts by weight, particularly preferably 0.01 to 10 parts by weight based on 100 parts by weight of the above resin solid components.

To the resin composition for coating of the present invention, a pigment such as titanium dioxide (titanium white), carbon black and phthalocyanine blue; an extender pigment such as calcium carbonate and barium sulfate and a solvent may be added to prepare an enamel paint according to the conventional method. Also, a clear paint may be prepared without adding the above pigments. As the method for preparing an enamel paint, there may be used, for example, a conventionally known method of using a roll, a sand mill or a disperser. Also, by using an oil color which has good compatibility with the resin composition for paint of the present invention, an enamel paint may be prepared. Further, to improve characteristics of a paint, a pigment dispersing agent or a leveling agent may be added when preparing the paint or after preparation of the paint.

EXAMPLES

In the following, Examples of the present invention are shown. In the abbreviations showing the kind of a resin, "A" represents a solvent type resin soluble in a solvent and "N" represents a non-aqueous dispersion type resin.

Synthetic Example 1

(1) Synthesis of Resin (A-1)

In a flask equipped with a stirring device, a reflux condenser and a thermometer were charged 400 g of mineral turpentine (available from Showa Shell Petroleum Co., Japan). After raising the temperature to 95° C., polymerizable unsaturated compounds and a polymerization initiator shown in Table 1 were added dropwise to the solvent over 2 hours.

TABLE 1

| Compound name | Formulated amount |
| --- | --- |
| 2-Ethylhexyl methacrylate | 240 g |
| t-Butyl methacrylate | 210 g |
| Styrene | 150 g |
| 2,2'-Azobis(isobutyronitrile) | 2.4 g |

After completion of dropwise addition, the temperature of the mixture was maintained for one hour, and then a solution of 2 g of t-butylperoxy-2-ethylhexanoate dissolved in 20 g of mineral turpentine was added dropwise over 30 minutes. After completion of dropwise addition, the temperature of the mixture was raised to 100° C. and maintained at the same temperature for one hour to complete the polymerization reaction. After cooling, mineral turpentine was further added to adjust the solid content (heating residue) to 50% by weight. This was named "A-1".

(2) Synthesis of Non-aqueous dispersion type resin (N-1)

In the similar flask as in (1), 400 g of the resin (A-1) synthesized in (1) were charged and 150 g of mineral turpentine were added thereto. After raising the temperature to 100° C., polymerizable unsaturated compounds and a polymerization initiator shown in Table 2 were added dropwise to the mixture over 2 hours.

TABLE 2

| Compound name | Formulated amount |
|---|---|
| Methyl methacrylate | 48 g |
| n-Butyl methacrylate | 26 g |
| Styrene | 19 g |
| Ethyl acrylate | 110 g |
| γ-Methacryloxypropyltrimethoxy silane | 37 g |
| 2,2'-Azobis(isobutyronitrile) | 1.5 g |

The solution which had been transparent before dropwise addition became turbid as polymerization reaction proceeds to give a non-aqueous dispersion. After completion of dropwise addition, the temperature of the mixture was maintained for one hour, and then a solution of 2 g of t-butyl-peroxy- 2-ethylhexanoate dissolved in 20 g of mineral turpentine was further added dropwise to the mixture. Then, the temperature of the mixture was maintained at 100° C. for further 2 hours to complete the polymerization reaction. After cooling, mineral turpentine was further added to adjust the solid content to 50% by weight. A milky white non-aqueous dispersion type resin having a resin viscosity of 5400 centipoise, an average particle size of 780 nm and an acid value of 1 or less could be obtained. This was named "N-1".

Synthetic example 2

(3) Synthesis of Resin (A-2)

In a flask equipped with a stirring device, a reflux condenser and a thermometer were charged 400 g of mineral turpentine. After raising the temperature to 95° C., polymerizable unsaturated compounds and a polymerization initiator shown in Table 3 were added dropwise to the solvent over 2 hours.

TABLE 3

| Compound name | Formulated amount |
|---|---|
| 2-Ethylhexyl methacrylate | 150 g |
| t-Butyl methacrylate | 180 g |
| Styrene | 150 g |
| Isobutyl methacrylate | 120 g |
| t-Butylperoxy-2-ethylhexanoate | 2.4 g |

After completion of dropwise addition, the temperature of the mixture was maintained for one hour, and then a solution of 2 g of t-butylperoxy-2-ethylhexanoate dissolved in 20 g of mineral turpentine was added dropwise over 30 minutes. After completion of dropwise addition, the temperature of the mixture was raised to 100° C. and maintained at the same temperature for one hour to complete the polymerization reaction. After cooling, mineral turpentine was further added to adjust the solid content to 50% by weight. This was named "A-2".

(4) Synthesis of Non-aqueous dispersion type resin (N-2)

In the similar flask as in (3), 400 g of the resin (A-2) synthesized in (3) were charged and 160 g of mineral turpentine were added thereto. After raising the temperature to 100° C., polymerizable unsaturated compounds and a polymerization initiator shown in Table 4 were added dropwise to the mixture over 2 hours.

TABLE 4

| Compound name | Formulated amount |
|---|---|
| Methyl methacrylate | 56 g |
| n-Butyl methacrylate | 33 g |
| Styrene | 22 g |
| Ethyl acrylate | 130 g |
| 2,2'-Azobis(isobutyronitrile) | 1.4 g |

The solution which had been transparent before dropwise addition became turbid as polymerization reaction proceeds to give a non-aqueous dispersion. After completion of dropwise addition, the temperature of the mixture was maintained for one hour, and then a solution of 2 g of t-butylperoxy-2-ethylhexanoate dissolved in 50 g of mineral turpentine was further added dropwise to the mixture. Then, the temperature of the mixture was maintained at 100° C. for further 2 hours to complete the polymerization reaction. After cooling, mineral turpentine was further added to adjust the solid content to 50% by weight. A milky white non-aqueous dispersion type resin having a resin viscosity of 4800 centipoise, an average particle size of 770 nm and an acid value of 1 or less could be obtained. This was named "N-2".

Synthetic Example 3

(5) Synthesis of Resin (A-3)

In a flask equipped with a stirring device, a reflux condenser and a thermometer were charged 400 g of mineral turpentine. After raising the temperature to 95° C., polymerizable unsaturated compounds and a polymerization initiator shown in Table 5 were added dropwise to the solvent over 2 hours.

TABLE 5

| Compound name | Formulated amount |
|---|---|
| 2-Ethylhexyl methacrylate | 150 g |
| t-Butyl methacrylate | 180 g |
| Styrene | 150 g |
| n-Butyl methacrylate | 180 g |
| t-Butylperoxy-2-ethylhexanoate | 2 g |

After completion of dropwise addition, the temperature of the mixture was maintained for one hour, and then a solution of 2 g of t-butylperoxy-2-ethylhexanoate dissolved in 50 g of mineral turpentine was added dropwise over 30 minutes. After completion of dropwise addition, the temperature of the mixture was raised to 100° C. and maintained at the same temperature for one hour to complete the polymerization reaction. After cooling, mineral turpentine was further added to adjust the solid content to 50% by weight. This was named "A-3".

(6) Synthesis of Non-aqueous dispersion type resin (N-3)

In the similar flask as in (5), 400 g of the resin (A-3) synthesized in (5) were charged and 150 g of mineral turpentine were added thereto. After raising the temperature to 100° C., polymerizable unsaturated compounds and a polymerization initiator shown in Table 6 were added dropwise to the mixture over 2 hours.

TABLE 6

| Compound name | Formulated amount |
| --- | --- |
| Methyl methacrylate | 76 g |
| n-Butyl methacrylate | 19 g |
| Styrene | 15 g |
| Ethyl acrylate | 76 g |
| γ-Methacryloxypropyltrimethoxy silane | 56 g |
| 2,2'-Azobis(isobutyronitrile) | 1.5 g |

The solution which had been transparent before dropwise addition became turbid as polymerization reaction proceeds to give a non-aqueous dispersion. After completion of dropwise addition, the temperature of the mixture was maintained for one hour, and then a solution of 2 g of t-butylperoxy- 2-ethylhexanoate dissolved in 50 g of mineral turpentine was further added dropwise to the mixture. Then, the temperature of the mixture was maintained at 100° C. for further 2 hours to complete the polymerization reaction. After cooling, mineral turpentine was further added to adjust the solid content to 50% by weight. A milky white non-aqueous dispersion type resin having a resin viscosity of 5000 centipoise, an average particle size of 760 nm and an acid value of 1 or less could be obtained. This was named "N-3".

Synthetic Example 4

(7) Synthesis of Resin (A-4)

In a flask equipped with a stirring device, a reflux condenser and a thermometer were charged 400 g of mineral turpentine. After raising the temperature to 95° C., polymerizable unsaturated compounds and a polymerization initiator shown in Table 7 were added dropwise to the solvent over 2 hours.

TABLE 7

| Compound name | Formulated amount |
| --- | --- |
| Isobutyl methacrylate | 120 g |
| Styrene | 120 g |
| 2-Ethylhexyl methacrylate | 180 g |
| t-Butyl methacrylate | 180 g |
| 2,2'-Azobis(isobutyronitrile) | 2.5 g |

After completion of dropwise addition, the temperature of the mixture was maintained for one hour, and then a solution of 2 g of t-butylperoxy-2-ethylhexanoate dissolved in 20 g of mineral turpentine was added dropwise over 30 minutes. After completion of dropwise addition, the temperature of the mixture was raised to 100° C. and maintained at the same temperature for one hour to complete the polymerization reaction. After cooling, mineral turpentine was further added to adjust the solid content to 50% by weight. This was named "A-4".

(8) Synthesis of Non-aqueous dispersion type resin (N-4)

In the similar flask as in (7), 400 g of the resin (A-4) synthesized in (7) were charged and 150 g of mineral turpentine were added thereto. After raising the temperature to 100° C., polymerizable unsaturated compounds and a polymerization initiator shown in Table 8 were added dropwise to the mixture over 2 hours.

TABLE 8

| Compound name | Formulated amount |
| --- | --- |
| Methyl methacrylate | 56 g |
| Ethyl acrylate | 110 g |
| Styrene | 37 g |
| γ-Methacryloxypropyltrimethoxy silane | 19 g |
| t-Butylperoxy-2-ethylhexanoate | 2 g |

The solution which had been transparent before dropwise addition became turbid as polymerization reaction proceeds to give a non-aqueous dispersion. After completion of dropwise addition, the temperature of the mixture was maintained for one hour, and then a solution of 2 g of t-butylperoxy-2-ethylhexanoate dissolved in 50 g of mineral turpentine was further added dropwise to the mixture. Then, the temperature of the mixture was maintained at 100° C. for 2 hours to complete the polymerization reaction. After cooling, mineral turpentine was further added to adjust the solid content to 50% by weight. A milky white non-aqueous dispersion type resin having a resin viscosity of 8500 centipoise, an average particle size of 740 nm and an acid value of 1 or less could be obtained. This was named "N-4".

Synthetic Example 5

(9) Synthesis of Resin (A-5)

In a flask equipped with a stirring device, a reflux condenser and a thermometer were charged 400 g of mineral turpentine. After raising the temperature to 95° C., polymerizable unsaturated compounds and a polymerization initiator shown in Table 9 were added dropwise to the solvent over 2 hours.

TABLE 9

| Compound name | Formulated amount |
| --- | --- |
| Isobutyl methacrylate | 120 g |
| Styrene | 120 g |
| 2-Ethylhexyl methacrylate | 180 g |
| t-Butyl methacrylate | 180 g |
| 2,2'1-Azobis(isobutyronitrile) | 2.5 g |

After completion of dropwise addition, the temperature of the mixture was maintained for one hour, and then a solution of 2 g of t-butylperoxy-2-ethylhexanoate dissolved in 50 g of mineral turpentine was added dropwise over 30 minutes. After completion of dropwise addition, the temperature of the mixture was raised to 100° C. and maintained at the same temperature for one hour to complete the polymerization reaction. After cooling, mineral turpentine was further added to adjust the solid content to 50% by weight. This was named "A-5".

(10) Synthesis of Non-aqueous dispersion type resin (N-5)

In the similar flask as in (9), 300 g of the resin (A-5) synthesized in (9) were charged and 250 g of mineral turpentine were added thereto. After raising the temperature to 100° C., polymerizable unsaturated compounds and a polymerization initiator shown in Table 10 were added dropwise to the mixture over 2 hours.

TABLE 10

| Compound name | Formulated amount |
|---|---|
| Methyl methacrylate | 150 g |
| Ethyl acrylate | 100 g |
| Styrene | 50 g |
| t-Butylperoxy-2-ethylhexanoate | 3 g |

The solution which had been transparent before dropwise addition became turbid as polymerization reaction proceeds to give a non-aqueous dispersion. After completion of dropwise addition, the temperature of the mixture was maintained for one hour, and then a solution of 2 g of t-butylperoxy- 2-ethylhexanoate dissolved in 30 g of mineral turpentine was further added dropwise to the mixture. Then, the temperature of the mixture was maintained at 100° C. for 2 hours to complete the polymerization reaction. After cooling, mineral turpentine was further added to adjust the solid content to 50% by weight. A milky white non-aqueous dispersion type resin having a resin viscosity of 4500 centipoise, an average particle size of 750 nm and an acid value of 1 or less could be obtained. This was named "N-5".

Synthetic Example 6

(11) Synthesis of Resin (A-6)

In a flask equipped with a stirring device, a reflux condenser and a thermometer were charged 400 g of mineral turpentine. After raising the temperature to 90° C., polymerizable unsaturated compounds and a polymerization initiator shown in Table 11 were added dropwise to the solvent over 2 hours.

TABLE 11

| Compound name | Formulated amount |
|---|---|
| n-Butyl methacrylate | 210 g |
| Styrene | 60 g |
| 2-Ethylhexyl methacrylate | 150 g |
| γ-Methacryloxypropyltrimethoxy silane | 150 g |
| γ-Mercaptopropyltrimethoxy silane | 12 g |
| 2,2'-Azobis(isobutyronitrile) | 2.5 g |

After completion of dropwise addition, the temperature of the mixture was maintained for one hour, and then a solution of 2 g of t-butylperoxy-2-ethylhexanoate dissolved in 20 g of mineral turpentine was added dropwise over 30 minutes. After completion of dropwise addition, the temperature of the mixture was raised to 100° C. and maintained at the same temperature for one hour to complete the polymerization reaction. After cooling, xylene was further added to adjust the solid content to 50% by weight. This was named "A-6".

Synthetic Example 7

(12) Synthesis of Resin (A-7)

In a flask equipped with a stirring device, a reflux condenser and a thermometer were charged 400 g of mineral turpentine. After raising the temperature to 95° C., polymerizable unsaturated compounds and a polymerization initiator shown in Table 12 were added dropwise to the solvent over 2 hours.

TABLE 12

| Compound name | Formulated amount |
|---|---|
| γ-Methacryloxypropyltrimethoxy silane | 120 g |
| Styrene | 120 g |
| Lauryl methacrylate | 192 g |
| Isobutyl methacrylate | 168 g |
| 2,2'-Azobis(isobutyronitrile) | 2.5 g |

After completion of dropwise addition, the temperature of the mixture was maintained for one hour, and then a solution of 2 g of t-butylperoxy-2-ethylhexanoate dissolved in 50 g of xylene was added dropwise over 30 minutes. After completion of dropwise addition, the temperature of the mixture was raised to 100° C. and maintained at the same temperature for one hour to complete the polymerization reaction. After cooling, xylene was further added to adjust the solid content to 50% by weight. This was named "A-7".

(13) Synthesis of Non-aqueous dispersion type resin (N-7)

In the similar flask as in (12), 400 g of the resin (A-7) synthesized in (12) were charged and 200 g of heptane were added thereto. After raising the temperature to 100° C., polymerizable unsaturated compounds and a polymerization initiator shown in Table 13 were added dropwise to the mixture over 2 hours.

TABLE 13

| Compound name | Formulated amount |
|---|---|
| Methyl methacrylate | 120 g |
| Acrylonitrile | 37 g |
| Styrene | 37 g |
| γ-Methacryloxypropyltrimethoxy silane | 48 g |
| 2,2'-Azobis(isobutyronitrile) | 1.3 g |

The solution which had been transparent before dropwise addition became turbid as polymerization reaction proceeds to give a non-aqueous dispersion. After completion of dropwise addition, the temperature of the mixture was maintained for one hour, and then a solution of 2 g of t-butylperoxy- 2-ethylhexanoate dissolved in 20 g of heptane was further added dropwise to the mixture. Then, the temperature of the mixture was maintained at 100° C. for 2 hours to complete the polymerization reaction. After cooling, heptane was further added to adjust the solid content to 50% by weight. A milky white non-aqueous dispersion type resin having a resin viscosity of 7500 centipoise, an average particle size of 960 nm and an acid value of 1 or less could be obtained. This was named "N-7".

Synthetic Example 8

(14) Synthesis of Resin (A-8)

In the same manner as in Synthetic example 1 (1) except for changing the polymerizable unsaturated compounds and the polymerization initiator to those shown in Table 14, an acrylic resin with a solid content of 50% by weight was obtained. This was named "A-8".

TABLE 14

| Compound name | Formulated amount |
| --- | --- |
| n-Butyl methacrylate | 200 g |
| γ-Methacryloxypropyltrimethoxy silane | 100 g |
| 2-Ethylhexyl methacrylate | 100 g |
| Styrene | 50 g |
| Methyl methacrylate | 50 g |
| 2,2'-Azobis(isobutyronitrile) | 2.5 g |

Synthetic Example 9

(15) Synthesis of Resin (A-9)

In the same manner as in Synthetic example 1 (1) except for changing the polymerizable unsaturated compounds and the polymerization initiator to those shown in Table 15, an acrylic resin with a solid content of 50% by weight was obtained. This was named "A-9".

TABLE 15

| Compound name | Formulated amount |
| --- | --- |
| Isobutyl methacrylate | 200 g |
| Styrene | 100 g |
| 2-Ethylhexyl acrylate | 100 g |
| Methyl methacrylate | 100 g |
| 2,2'-Azobis(isobutyronitrile) | 2.5 g |

In the following, all "part(s)" means "part(s) by weight".

EXAMPLES 1 to 7

First, changes in viscosities and average particle sizes at 40° C. of resin compositions obtained by mixing 135 parts of any one of resins (N-1), (N-2), (N-3), (N-4) and (N-5) obtained in Synthetic examples 1 to 5, respectively, and 15 parts of the resin (A-6) were measured. The results are shown in Table 16.

Comparative Examples 1 to 4

In the same manner as in Examples 1 to 7 except for using the resins (N-7) and (A-8) obtained in Synthetic examples 6 and 7, the same measurements were carried out. The results are also shown in Table 16.

Next, respective resins prepared in Synthetic examples 1 to 6 and Comparative synthetic examples 1 to 3 are mixed and kneaded with 75 parts of a white oil color in an amount as shown in Table 17 to prepare a white colored paint, respectively.

The white oil color was prepared by using 15 parts of the resin (A-6) obtained in Synthetic example 6 as a vechicle and 50 parts of titanium white Tipaque CR-95 (titanium dioxide pigment, trade name, available from Ishihara Sangyo K.K., Japan) as a pigment, and the mixture was mixed and kneaded with 10 parts of mineral turpentine.

Using mineral turpentine as a thinner, the respective paints were so adjusted to have a viscosity of 15 sec. (at 25° C.) by Ford Cup #4 and subjected to spray coating on a slate board (JIS F5403 standard) so as to have a coated film thickness after drying of 25 to 35 μm. These coated boards were allowed to stand in a cure room regulated by JIS standard for 2 weeks to prepare test boards for evaluation. The evaluation results are shown in Tables 17 and 18.

Test methods for evaluation are shown below.

(1) Yield stress (difficulties of causing sags): measured according to the Cone & Plate method.

(2) Residual viscosity (lightness of brushing): measured according to the Cone & Plate method.

(3) Curability: The coating film was cured under the conditions of a temperature of 23°±2° C. and a humidity of 75±10% for a time described in Tables 17 and 18 and then extracted by the Soxhlet extracting method* to obtain a gel fraction.

* Extraction condition: By using a mixed solution of acetone/methanol (1/1 weight ratio), extraction was carried out for 8 hours.

$$\text{Gel fraction} (\%) = \frac{\text{weight of coated film after extraction}}{\text{weight of coated film before extraction}} \times 100$$

(4) Stain resistance: Carbon powder was shaked on the coated film and allowed to stand for 12 hours, then washed and the color differences between the stain portion and the non-stain portion were measured.

(5) Impact resistance: measured according to the method defined in JIS 1421 method.

(6) Accelerated weathering resistance: Using Sunshine weatherometer (trade name, manufactured by Suga Shikenki, Japan), a gloss of the coated film was mea-

TABLE 16

(Storage stability)

| | | Kind of resin* | | | | | | |
| --- | --- | --- | --- | --- | --- | --- | --- | --- |
| | | N - 1 | N - 2 | N - 3 | N - 4 | N - 5 | N - 7 | A - 8 |
| Change in viscosity | 10th day | 100% | 102% | 105% | 100% | 103% | 125% | 115% |
| | 20th day | 104% | 107% | 107% | 105% | 108% | 180% | 135% |
| | 30th day | 110% | 110% | 110% | 108% | 111% | 290% | 150% |
| Change in average particle size | Initial particle size | 780 nm | 770 nm | 760 nm | 740 nm | 750 nm | 950 nm | — |
| | 30th day | 780 nm | 785 nm | 755 nm | 745 nm | 750 nm | 1400 nm | — |
| | 60th day | 790 nm | 785 nm | 780 nm | 760 nm | 760 nm | 1840 nm | — |
| | 90th day | 800 nm | 790 nm | 785 nm | 765 nm | 770 nm | 2250 nm | — |

* N - 1, N - 2, N - 3, N - 4 and N - 5 are each mixture of 135 parts itself and 15 parts of the resin (A - 6).

sured under the conditions of JIS 5400 and gloss retention ratio was measured.

$$\text{Gloss retention ratio (\%)} = \frac{\text{Gloss after irradiation of predetermined time}}{\text{Initial gloss}} \times 100$$

As can be seen from the results shown in Tables 17 and 18, it can be understood that the resin composition for coating of the present invention is excellent in storage stability and can provide a paint in which a coated film has excellent stain resistance, curability, impact resistance and weather resistance.

We claim:

1. A resin composition for coating which comprises a mixture of (i) a non-aqueous dispersion resin containing
   (A) a vinyl polymer soluble in an organic solvent mainly comprising an aliphatic hydrocarbon, and
   (B) vinyl polymer particles which are insoluble in the organic solvent and obtained by polymerizing a polymerizable unsaturated compound in the organic solvent using the vinyl polymer (A) as a dispersant, and (ii) a solvent resin of

TABLE 17

| | Item | | Example 1 | Example 2 | Example 3 | Example 4 | Example 5 | Example 6 | Example 7 |
|---|---|---|---|---|---|---|---|---|---|
| Formu- | White oil color | | 75 parts | 75 parts | 75 parts | 75 parts | 75 parts | 75 parts | 75 parts |
| lation | Kind of resin | | N - 1 | N - 2 | N - 3 | N - 4 | N - 5 | N - 1 | N - 2 |
| | | | 135 parts | 135 parts | 135 parts | 135 parts | 135 parts | 127 parts | 120 parts |
| | | | A - 6 | A - 6 | A - 6 | A - 6 | A - 6 | A - 6 | A - 6 |
| | | | 15 parts | 15 parts | 15 parts | 15 parts | 15 parts | 8 parts | 30 parts |
| | Curing agent* | | 0.02 part | 0.02 part | 0.02 part | 0.02 part | 0.02 part | 0.02 part | 0.02 part |
| Charac- | Yield stress | | 40 | 41 | 39 | 38 | 40 | 43 | 37 |
| teris- | (dyn/cm$^3$) | | | | | | | | |
| tics | Residual viscos- | | 480 | 530 | 590 | 600 | 580 | 500 | 470 |
| | Cur- | 6 hours | 73 | 75 | 76 | 69 | 72 | 70 | 78 |
| | abil- | 12 hours | 82 | 82 | 85 | 73 | 79 | 80 | 84 |
| | ity | 24 hours | 89 | 86 | 89 | 85 | 83 | 86 | 90 |
| | | 48 hours | 96 | 92 | 96 | 91 | 94 | 95 | 95 |
| | Stain resistance | | 3.0 | 2.8 | 2.5 | 3.8 | 3.3 | 3.2 | 2.4 |
| | ($\Delta$E) | | | | | | | | |
| | Impact resistance | | 70 | 70 | 70 | 65 | 65 | 70 | 63 |
| | Accel- | 500 hours | 100 | 100 | 100 | 100 | 100 | 100 | 100 |
| | erated | 1000 hours | 99 | 100 | 99 | 100 | 100 | 100 | 100 |
| | weath- | 1500 hours | 97 | 95 | 98 | 96 | 97 | 97 | 96 |
| | ering | 2000 hours | 95 | 93 | 93 | 94 | 95 | 94 | 93 |
| | resist- | 2500 hours | 92 | 89 | 91 | 92 | 93 | 91 | 90 |
| | ance | 3000 hours | 89 | 88 | 89 | 91 | 92 | 88 | 90 |

*dibutyl tin dilaulate

TABLE 18

| | Item | | Comparative example 1 | Comparative example 2 | Comparative example 3 | Comparative example 4 |
|---|---|---|---|---|---|---|
| Formu- | White oil color | | 75 parts | 75 parts | 75 parts | 75 parts |
| lation | Kind of resin | | N - 7 | A - 8 | N - 1 | N - 1 |
| | | | 135 parts | 135 parts | 150 parts | 135 parts |
| | | | — | — | — | A - 9 |
| | | | | | | 15 parts |
| | Curing agent* | | 0.02 part | 0.02 part | 0.02 part | 0.02 part |
| Charac- | Yield stress | | 35 | 10 | 34 | 39 |
| teris- | (dyn/cm$^3$) | | | | | |
| tics | Residual viscos- | | 650 | 2800 | 850 | 910 |
| | ity (cps) | | | | | |
| | Cur- | 6 hours | 67 | 45 | 39 | 33 |
| | abil- | 12 hours | 75 | 55 | 53 | 40 |
| | ity | 24 hours | 81 | 69 | 61 | 55 |
| | | 48 hours | 85 | 80 | 72 | 67 |
| | Stain resistance | | 22.5 | 13.2 | 38.4 | 48.5 |
| | ($\Delta$E) | | | | | |
| | Impact resistance | | 50 | 12 | 43 | 46 |
| | Accel- | 500 hours | 100 | 88 | 99 | 98 |
| | erated | 1000 hours | 96 | 97 | 91 | 92 |
| | weath- | 1500 hours | 93 | 91 | 85 | 89 |
| | ering | 2000 hours | 88 | 88 | 81 | 84 |
| | resist- | 2500 hours | 82 | 86 | 74 | 76 |
| | ance | 3000 hours | 80 | 84 | 66 | 68 |

*dibutyl tin dilaulate (C) a vinyl polymer having a silyl group represented by the formula (I) which is soluble in the organic solvent:

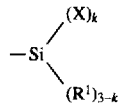
(I)

wherein $R^1$ represents an alkyl group, an aryl group or an aralkyl group, X represents a halogen atom, an alkoxy group, an acyloxy group or a hydroxy group, and k is an integer of 1 to 3, and wherein said vinyl polymer (A) is a polymer which contains 60% by weight or more of a methacrylate unit having 4 to 30 alkyl carbon atoms or an acrylate unit having 4 to 30 alkyl carbon atoms and which does not contain a silyl group represented by the formula (I), and said non-aqueous dispersion resin and said solvent resin are contained in a weight ratio of 97/3 to 70/30.

2. The resin composition according to claim 1, wherein said vinyl polymer (A) is a polymer prepared from a monomeric material comprising at least one monomer selected from the group consisting of an acrylate or methacrylate each having 4 to 30 alkyl carbon atoms, and optionally at least one monomer selected from the group consisting of an acrylate or methacrylate each having 3 or less alkyl carbon atoms, a hydroxy group-containing acrylate or methacrylate, and an amino group-containing acrylate or methacrylate.

3. The resin composition according to claim 2, wherein said acrylate or methacrylate having 4 or more alkyl carbon atoms is selected from the group consisting of n-butyl acrylate, t-butyl acrylate, isobutyl acrylate, 2-ethylhexyl acrylate, lauryl acrylate, hexyl acrylate, cyclohexyl acrylate, octyl acrylate, isobornyl acrylate, dicyclopentanyl acrylate, n-butyl methacrylate, t-butyl methacrylate, isobutyl methacrylate, 2-ethylhexyl methacrylate, lauryl methacrylate, hexyl methacrylate, cyclohexyl methacrylate, octyl methacrylate, isobornyl methacrylate and dicyclopentanyl methacrylate.

4. The resin composition according to claim 1, wherein the vinyl polymer particles (B) are a polymer prepared from a monomeric material comprising at least one monomer selected from the group consisting of an acrylate or methacrylate each having 3 or less alkyl carbon atoms, a hydroxy group-containing acrylate or methacrylate, and an amino group-containing acrylate or methacrylate.

5. The resin composition according to claim 4, wherein the vinyl polymer particles (B) are a polymer prepared from a monomeric material comprising at least one monomer selected from the group consisting of methyl acrylate, ethyl acrylate, n-propyl acrylate, isopropyl acrylate, methyl methacrylate, ethyl methacrylate, n-propyl methacrylate, isopropyl methacrylate, 2-hydroxyethyl acrylate, 2-hydroxypropyl acrylate, 2-hydroxyethyl methacrylate, 2-hydroxypropyl methacrylate, N,N-dimethylaminoethyl acrylate, N,N-diethylaminoethyl acrylate, N,N-dimethylaminopropyl acrylate, N,N-dimethylaminoethyl methacrylate, N,N-diethylaminoethyl methacrylate and N,N-dimethylaminopropyl methacrylate.

6. The resin composition according to claim 1, wherein the vinyl polymer having the silyl group is a polymer comprising a monomer represented by the formula (II):

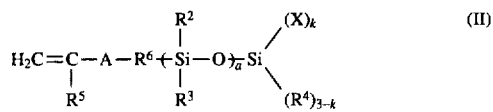
(II)

wherein $R^2$ and $R^3$ each represent a hydrogen atom, an alkyl group, an aryl group or an aralkyl group; $R^4$ represents an alkyl group, aryl group or an aralkyl group; $R^5$ represents a hydrogen atom or a methyl group; $R^6$ represents a divalent organic group; A represents —COO— or a phenylene group; X represents a halogen atom, an alkoxy group, an acyloxy group or a hydroxy group; a is 0 or an integer of 1 to 20; and k is an integer of 1 to 3.

7. The resin composition according to claim 6, wherein the monomer of Formula II is at least one selected from the group consisting of γ-acryloxyethyltrimethoxy silane, γ-acryloxyethyltriethoxy silane, γ-acryloxypropyltrimethoxy silane, γ-acryloxypropyltriethoxy silane, γ-acryloxypropylmethyldimethoxy silane, γ-acryloxypropyldimethylmethoxy silane, γ-acryloxypropylmethyldiethoxy silane, γ-acryloxypropyldimethylethoxy silane, γ-acryloxypropyltrichloro silane, γ-acryloxypropylmethyldichloro silane, γ-acryloxypropyldimethylchloro silane, γ-acryloxypropyltripropoxy silane, γ-acryloxypropylmethyldipropoxy silane, γ-acryloxypropyltributoxy silane, γ-acryloxybutyltrimethoxy silane, γ-acryloxypentyltrimethoxy silane, γ-acryloxyhexyltrimethoxy silane, γ-acryloxyhexyltriethoxy silane, γ-acryloxyoctyltrimethoxy silane, γ-acryloxydecyltrimethoxy silane, γ-acryloxydodecyltrimethoxy silane, γ-acryloxyoctadecyltrimethoxy silane, γ-methacryloxyethyltrimethoxy silane, γ-methacryloxyethyltriethoxy silane, γ-methacryloxypropyltrimethoxy silane, γ-methacryloxypropyltriethoxy silane, γ-methacryloxypropylmethyldimethoxy silane, γ-methacryloxypropyldimethylmethoxy silane, γ-methacryloxypropylmethyldiethoxy silane, γ-methacryloxypropyldimethylethoxy silane, γ-methacryloxypropyltrichloro silane, γ-methacryloxypropylmethyldichloro silane, γ-methacryloxypropyldimethylchloro silane, γ-methacryloxypropyltripropoxy silane, γ-methacryloxypropylmethyldipropoxy silane, γ-methacryloxypropyltributoxy silane, γ-methacryloxybutyltrimethoxy silane, γ-methacryloxypentyltrimethoxy silane, γ-methacryloxyhexyltrimethoxy silane, γ-methacryloxyhexyltriethoxy silane, γ-methacryloxyoctyltrimethoxy silane, γ-methacryloxydecyltrimethoxy silane, γ-methacryloxydodecyltrimethoxy silane, γ-methacryloxyoctadecyltrimethoxy silane,

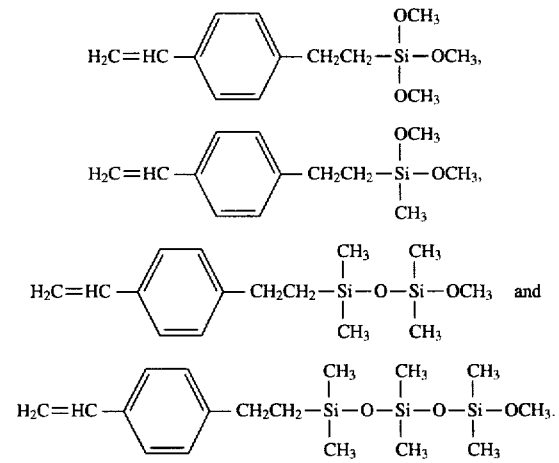

8. A paint comprising the resin composition for coating as claimed in claim 1.

9. The resin composition according to claim 1, wherein the vinyl polymer (A) is a polymer obtained by copolymerizing a (meth)acrylate containing 4 to 30 alkyl carbon atoms with at least one other polymerizable unsaturated compound selected from the group consisting of a styrene, vinyl toluene, vinyl chloride, vinylidene chloride, acrylonitrile and acrylamide.

10. A resin composition for coating which comprises a mixture of:

(i) a non-aqueous dispersion resin containing
an organic solvent mainly comprising an aliphatic hydrocarbon and a vinyl polymer (A) soluble in the organic solvent, and
particles of a vinyl polymer (B) which is insoluble in the organic solvent and which is obtained by polymerizing a polymerizable unsaturated compound in the organic solvent using the vinyl polymer (A) as a dispersant, and (ii) a resin solution containing
the organic solvent and a vinyl polymer (C) which has a silyl group represented by the formula (I) and which is soluble in the organic solvent:

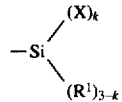
(I)

wherein $R^1$ represents an alkyl group, aryl group or an aralkyl group, X represents a halogen atom, an alkoxy group, an acyloxy group or a hydroxy group, and k is an integer of 1 to 3, and wherein said vinyl polymer (A) is a polymer which contains 60% by weight or more of a methacrylate unit having 4 to 30 alkyl carbon atoms or an acrylate unit having 4 to 30 alkyl carbon atoms and which does not contain a silyl group represented by the formula (I), and said non-aqueous dispersion resin and a solvent resin comprising said vinyl polymer (C) are contained in a weight ratio of 97/3 to 70/30.

11. The resin composition according to claim 10, wherein said organic solvent is at least one selected from the group consisting of pentane, hexane, heptane, octane, decane, cyclohexane, methylcyclohexane, ethylcyclohexane, mineral spirit, mineral thinner, petroleum spirit, white spirit and mineral turpentine.

12. The resin composition according to claim 10, wherein the ratio of the vinyl polymer (A) and the vinyl polymer particles (B) is in the range of 10/90 to 60/90 in weight ratio.

13. The resin composition according to claim 10, wherein average particle size of the vinyl polymer particles (B) is within the range of from about 100 to 2000 nm.

14. The resin composition according to claim 1, wherein the ratio of the vinyl polymer (A) and the vinyl polymer particles (B) is in the range of from 10/90 to 60/40 in weight ratio.

15. The resin composition according to claim 1, wherein average particle size of the vinyl polymer particles (B) is within the range of from about 100 to 2000 nm.

* * * * *